United States Patent
Lehmen et al.

(10) Patent No.: US 9,470,173 B2
(45) Date of Patent: Oct. 18, 2016

(54) SYSTEM AND METHOD FOR REDUCING ENGINE OIL DILUTION

(71) Applicant: Ford Global Technologies, LLC, Dearborn, MI (US)

(72) Inventors: Allen Lehmen, Howell, MI (US); Marcus William Fried, Farmington Hills, MI (US); Shuya Shark Yamada, Novi, MI (US); Steven Paul Penkevich, New Hudson, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 206 days.

(21) Appl. No.: 14/308,051

(22) Filed: Jun. 18, 2014

(65) Prior Publication Data
US 2015/0369157 A1  Dec. 24, 2015

(51) Int. Cl.
F02D 41/40 (2006.01)
F02D 41/06 (2006.01)

(52) U.S. Cl.
CPC .......... *F02D 41/401* (2013.01); *F02D 41/064* (2013.01); *F02D 2200/021* (2013.01); *F02D 2250/11* (2013.01); *Y02T 10/44* (2013.01)

(58) Field of Classification Search
CPC .............. F02D 2200/021; F02D 2250/11; F02D 41/064; F02D 41/401; F01M 2001/165; F01M 2011/1493; F02N 2200/023; F02N 2300/2002; G01N 33/2888
USPC .......... 701/102–105, 113; 123/179.1, 179.3, 123/294, 299, 435, 445, 478, 480
See application file for complete search history.

(56) References Cited

U.S. PATENT DOCUMENTS

| 8,421,486 B2 | 4/2013 | Akiyama et al. |
| 8,464,576 B2 | 6/2013 | Okuyama et al. |
| 2003/0194811 A1* | 10/2003 | Reischman ............ G01N 21/33 436/60 |
| 2005/0229903 A1* | 10/2005 | Kobayashi ............ F02D 35/023 123/435 |
| 2008/0029064 A1* | 2/2008 | Chiba ................... F02D 41/029 123/445 |
| 2008/0295491 A1* | 12/2008 | Kuboshima ............ F01M 1/18 60/285 |
| 2009/0013961 A1* | 1/2009 | Forthmann ............. F01M 1/18 123/299 |
| 2009/0133387 A1* | 5/2009 | Nishizawa ........... F02D 41/029 60/286 |
| 2009/0177364 A1* | 7/2009 | Hattori ................. F02D 41/047 701/103 |

(Continued)

FOREIGN PATENT DOCUMENTS

| EP | 0174601 B1 | 1/1990 |
| EP | 2123868 A1 | 11/2009 |
| JP | 2003322044 | * 11/2003 ............. F02D 41/02 |

OTHER PUBLICATIONS

160223 Hirose et al JP 2003-322044 English machine translation.*

(Continued)

*Primary Examiner* — Erick Solis
*Assistant Examiner* — Carl Staubach
(74) *Attorney, Agent, or Firm* — Julia Voutyras; Alleman Hall McCoy Russell & Tuttle LLP

(57) ABSTRACT

Methods and systems are provided for modeling an oil dilution qualitative indicator based on an integrated difference between a commanded air-to-fuel ratio and an engine air-to-fuel ratio as determined via an oxygen sensor, cumulative cold engine temperature operating duration, and fuel injection characteristics (timing, duration, number of injections) allowing fuel injection timing modifications that minimize oil dilution when the oil dilution qualitative indicator is greater than a threshold level.

18 Claims, 6 Drawing Sheets

(56) References Cited

U.S. PATENT DOCUMENTS

| | | | |
|---|---|---|---|
| 2010/0011745 A1* | 1/2010 | Yokoi | F01M 11/12 60/277 |
| 2010/0083937 A1* | 4/2010 | Tsunooka | F02D 41/0025 123/435 |
| 2010/0332109 A1* | 12/2010 | Miura | F02D 35/025 701/105 |
| 2011/0066352 A1* | 3/2011 | Blanchard | F02D 19/0628 701/102 |
| 2012/0109498 A1* | 5/2012 | Murase | F02D 41/0025 701/103 |
| 2013/0233946 A1 | 9/2013 | Kobayashi | |
| 2013/0268182 A1 | 10/2013 | Treharne et al. | |
| 2014/0058647 A1* | 2/2014 | Haladyna | B60W 20/18 701/104 |

OTHER PUBLICATIONS

"Motor Oil Degradation," Lubrication Engineers, No. 68, 4 pages.
Zigler, Brad, "Study Reveals Fuel Injection Timing Impact on Particle Number Emissions," National Renewable Energy Laboratory, Golden, CO., Dec. 2012, 1 page.

* cited by examiner

SYSTEM AND METHOD FOR REDUCING ENGINE OIL DILUTION

FIELD

The present disclosure relates to systems and methods for reducing engine oil dilution.

BACKGROUND AND SUMMARY

During cold engine operation, including cold engine starts, if the engine does not reach stable engine operating conditions, fuel dilution of the engine oil can occur. For example, fuel may mix with engine oil in an engine's crankcase. Repeated cold start engine operation without completing engine warm-up may result in excessive fuel dilution and degradation of oil quality. Further, this can cause oil overfill conditions which in turn may generate fuel odors perceptible by the vehicle operator.

Treharne et al. (US 2013/0268182) describes a method of reducing oil contamination in a hybrid vehicle by starting an engine if the energy stored in an energy storage device is greater than an upper threshold level when a contaminant amount in engine oil is greater than a threshold amount. Herein, engine is run inefficiently to increase heat output and thereby, reduce oil contamination. The inventors herein have recognized potential issues with the above approach. Namely, during the inefficient engine operation, the engine may be operated with late fuel injection timing in order to increase heat output as well as to reduce particulate matter emissions, and operating a vehicle engine with late fuel injection timing can increase oil dilution, especially during repeated cold engine starts before the engine has warmed up.

One approach that addresses the aforementioned issues is a method for a vehicle engine, comprising: advancing a fuel injection timing with respect to a base fuel injection timing in a first combustion cycle to reduce oil dilution in response to an oil dilution amount greater than a threshold dilution amount, and wherein the base fuel injection timing is applied when the oil dilution amount is less than the threshold dilution amount.

In another example, a method for an engine may comprise: during a first condition when an oil dilution amount is greater than a threshold, adjusting a fuel injection timing earlier; and during a second condition when the oil dilution amount is less than the threshold, adjusting a fuel injection timing later than the earlier timing. The fuel injection that has its timing adjusted in this way may be a late injection or second injection of a split fuel injection. The adjustment may occur during engine cold starting and before engine warm-up is completed over a number of engine cycles of the start, and over a number of engine starts, each of which being a start of engine operation that ends before reaching a warmed-up engine condition, such as engine coolant temperature reaching a threshold, or engine block temperature reaching a threshold.

In still another example, a method for an engine may comprise: adjusting a fuel injection timing of multiple injections per combustion cycle earlier relative to TDC in response to an oil dilution level being greater than a threshold level; and adjusting fuel injection timing for at least one injection per combustion cycle later relative to TDC in response to the oil dilution level being less than the threshold level.

Oil dilution may be determined in a variety of ways. For example, it may be based on air-fuel ratios sampled at various portions of an engine start and warm-up. Further, it may be based a sensor measuring oil quantities, such as viscosity. Still other approaches may also be used, such as integrating a difference between a commanded air-to-fuel ratio and an engine air-to-fuel ratio.

In this way, by adjusting fuel injection timing in response to an oil dilution amount, the oil dilution amount based on the commanded air-to-fuel ratio and the engine air-to-fuel ratio, excess oil dilution may be reduced and emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
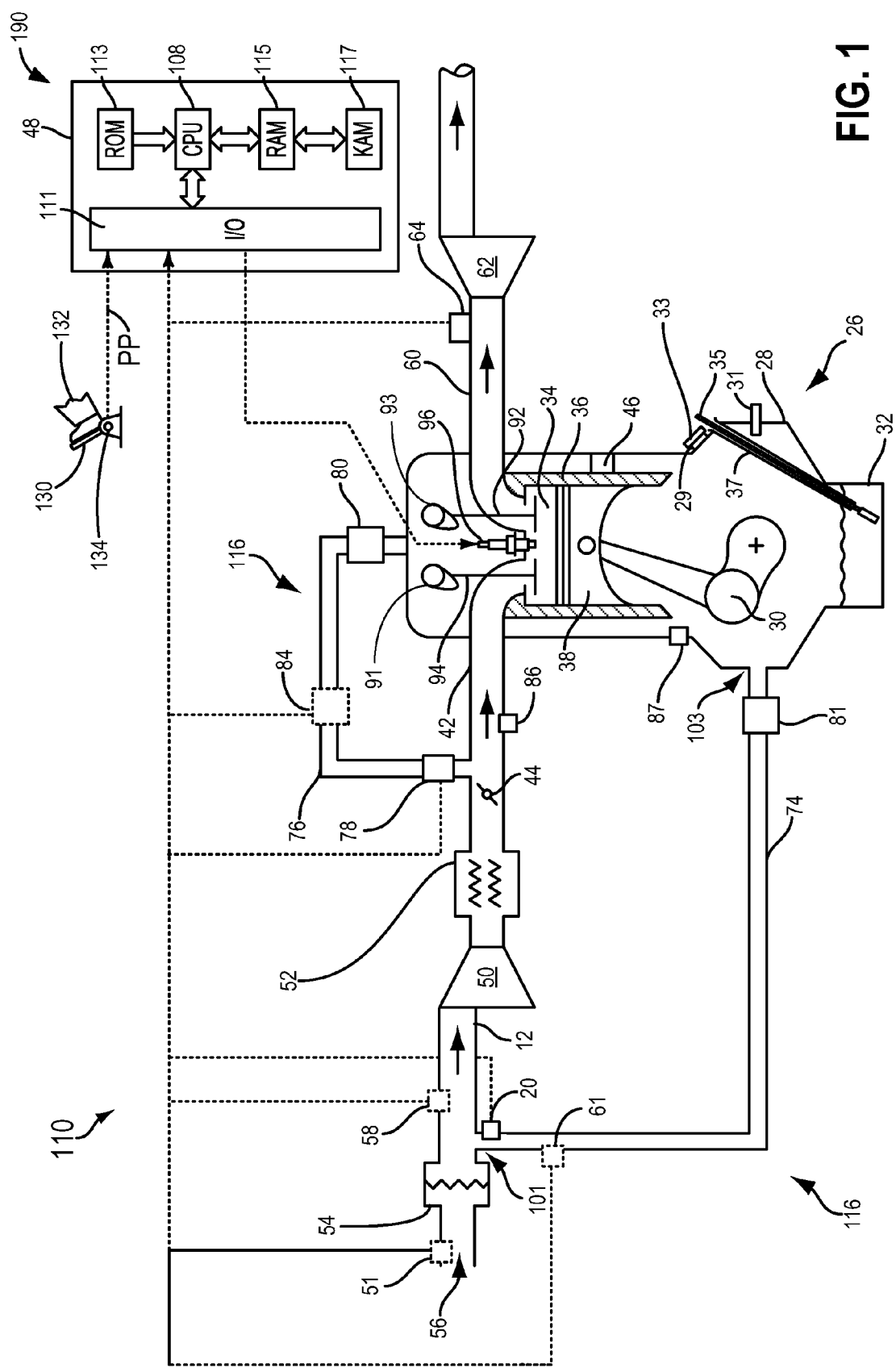
FIG. 1 illustrates an example of an engine with a positive crankcase ventilation (PCV) system.
Figure 2:
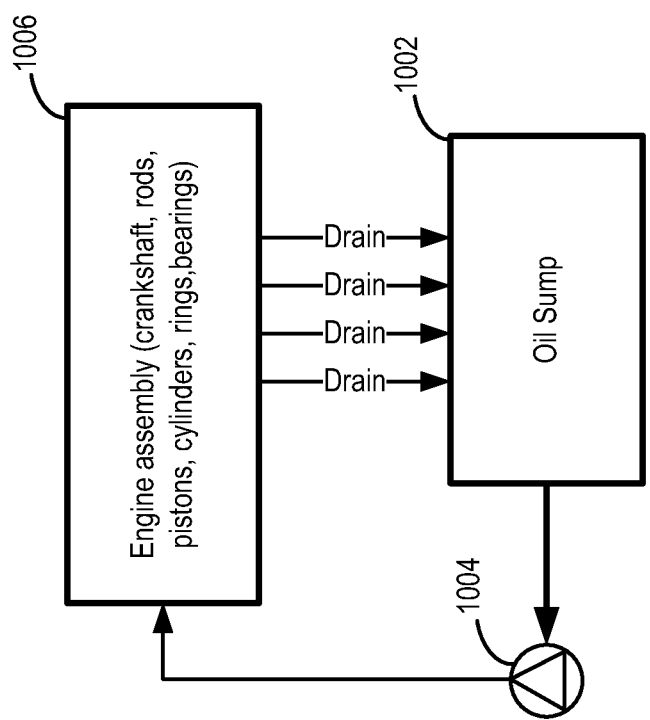
FIG. 2 schematically depicts flow of oil in a lubrication system of the engine.

The following description relates to systems and methods for adjusting engine fuel injection timing based on an oil dilution amount in an engine system, such as the engine system of FIG. 1. Oil flow in a lubrication system of the engine system of FIG. 1 is shown at FIG. 2. An engine controller may perform a control routine, such as the routine of FIG. 3, to determine an oil dilution amount, and the controller may adjust fuel injection timing to mitigate oil dilution when the oil dilution amount is greater than the threshold. Further, when the oil dilution amount is less than the threshold, fuel injection timing may be adjusted to reduce engine emissions. The oil dilution amount may be determined based on an integrated difference between a commanded air-to-fuel ratio and an engine air-to-fuel ratio. Example oil dilution amount adjustments based on the air-to-fuel ratios, and fuel injection timing adjustments based on the oil dilution amount are shown at FIGS. 4-5.

FIG. 1 shows an example configuration of a multi-cylinder engine generally depicted at 110, which may be included in a propulsion system of an automobile. Engine 110 may be controlled at least partially by a control system 190 of the vehicle including controller 48 and by input from a vehicle operator 132 via an input device 130. In this example, input device 130 includes an accelerator pedal and a pedal position sensor 134 for generating a proportional pedal position signal PP.

Engine 110 may include a lower portion of the engine block, indicated generally at 26, which may include a crankcase 28 encasing a crankshaft 30. Crankcase 28 may include an oil sump 32, otherwise referred to as an oil well, holding engine lubricant (e.g., oil) positioned below the crankshaft 30. During some conditions, fuel may enter crankcase 28 via engine cylinders, for example. An oil fill port 29 may be disposed in crankcase 28 so that oil may be supplied to oil sump 32. Oil fill port 29 may include an oil cap 33 to seal oil port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation. Further, crankcase 28 may include an air-to-fuel ratio sensor for sensing an air-to-fuel ratio in a positive crankcase ventilation (PCV) system 116.

The upper portion of engine block 26 may include a combustion chamber (e.g., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 26 may also include an engine coolant temperature (ECT) sensor 46 input into a controller 48 (described in more detail below herein).

A throttle 44 may be disposed in the engine intake to control the airflow entering intake manifold 42 and may be preceded upstream by compressor 50 followed by charge air cooler 52, for example. Compressor 50 may compress the intake air to engine 110, thereby boosting intake air pressure and density providing boosted engine conditions (e.g., manifold air pressure>barometric pressure), for example during increased engine loads. An air filter 54 may be positioned upstream compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it, and turbine 62 may be driven by the flow of exhaust gases passing there through. Furthermore, turbine 62 may be mechanically coupled to compressor 50 via a common shaft (not shown), such that rotation of turbine 62 may drive compressor 50. Sensor 64 may be a suitable sensor for providing an indication of engine air-to-fuel ratio from exhaust gas constituents. For example, sensor 64 may be a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be in electrical communication with controller 48. As discussed herein, the engine air-to-fuel ratio may be utilized to estimate an oil dilution amount.

In the example of FIG. 1, a positive crankcase ventilation system (PCV) 116 is coupled to a fresh air intake 12 of an engine 110 so that gases in the crankcase 28 may be vented in a controlled manner.

Engine 110 includes combustion chamber (cylinder) 34 and cylinder walls 36 with piston 38 positioned therein and connected to crankshaft 30. Combustion chamber 34 is shown communicating with intake manifold 42 and exhaust manifold 60 via respective intake valve 94 and exhaust valve 92. Each intake and exhaust valve may be operated by an intake cam 91 and an exhaust cam 93. The opening and closing time of exhaust valve 92 may be adjusted relative to crankshaft position via an exhaust cam phaser (not shown). The opening and closing time of intake valve 52 may be adjusted relative to crankshaft position via an intake cam phaser (not shown). The position of intake cam 91 may be determined by an intake cam sensor (not shown). The position of exhaust cam 93 may be determined by exhaust cam sensor (not shown). In this way, controller 48 may control the cam timing through phasers. Variable cam timing (VCT) may be either advanced or retarded, depending on various factors such as engine load and engine speed (RPM).

During normal engine operation, gases in the combustion chamber 34 may escape past the piston. These blow-by gases may include un-combusted fuel, combustion products, and air. Blow-by gases can dilute and contaminate oil, causing corrosion to engine components and contributing to sludge build-up, reducing the protective and lubricating properties of the oil. At higher engine speeds, blow-by gases can increase crankcase pressure such that oil leakage may occur from sealed engine surfaces. The PCV system 116 may help to vent and remove blow-by gases from the engine crankcase in a controlled manner in order to mitigate these undesirable effects of blow-by gases and may combine them with an engine intake stream so that they may be combusted within the engine. By redirecting blow-by gases to the engine intake, the PCV system 116 further aids in reducing engine emissions by precluding venting of blow-by gases to the atmosphere.

The PCV system 116 includes a PCV valve 78 in communication with engine crankcase 28. As an example, the PCV valve 78 may be mechanically coupled to a valve cover in the engine, which may allow for the PCV system to draw blow-by gases from the engine while reducing the entrainment of oil from the crankcase. The PCV valve 78 may also be in fluidic communication with the engine intake manifold 42. The PCV valve gas flow rate may vary with engine conditions such as engine speed and load, and the PCV valve 78 may be calibrated for a particular engine application wherein the PCV valve gas flow rate may be adjusted as operating conditions change. As an example, when the engine is off, the PCV valve may be closed and no gases may flow through the PCV valve 78. When the engine speed is idling or low, or during deceleration when the intake manifold vacuum is relatively high, the PCV valve 78 may open slightly, allowing for restricted PCV valve gas flow rates. At engine speeds or loads higher than at idle conditions, intake manifold vacuum may lower, and the PCV valve 78 may allow for higher PCV valve gas flow rates. PCV valve 78 may include a conventional PCV valve or a push-pull type PCV valve.

During non-boosted conditions (when intake manifold pressure (MAP) is less than barometric pressure (BP)), the PCV system 116 draws air into crankcase 28 via a breather or crankcase ventilation (vent) tube 74. A first end 101 of crankcase ventilation tube 74 may be mechanically coupled, or connected, to fresh air intake 12 upstream of compressor 50. In some examples, the first end 101 of crankcase ventilation tube 74 may be mechanically coupled to fresh air intake 12 downstream of air filter 54 (as shown). In other examples, the crankcase ventilation tube may be mechanically coupled to fresh air intake 12 upstream of air filter 54. In yet another example, the crankcase ventilation tube may be mechanically coupled to air filter 54. A second end 103, opposite first end 101, of crankcase ventilation tube 74 may be mechanically coupled, or connected, to crankcase 28 via an oil separator 81.

In some examples, crankcase ventilation tube 74 may include a pressure sensor 61 coupled therein. Pressure sensor 61 may be an absolute pressure sensor or a gauge sensor. One or more additional pressure and/or flow sensors may be coupled to the PCV system 116 at alternate locations. For example, a barometric pressure sensor (BP sensor) 51 may be coupled to intake passage 56, upstream of air filter 54, for providing an estimate of barometric pressure (BP). In one example, where pressure sensor 61 is configured as a gauge sensor, BP sensor 51 may be used in conjunction with pressure sensor 61. In some examples, a compressor inlet pressure (CIP) sensor 58 may be coupled in intake passage 56 downstream of air filter 54 and upstream of compressor 50 to provide an estimate of the compressor inlet pressure (CIP). A PCV system air-to-fuel ratio (AFR) sensor 31 may be disposed in crankcase 28 to measure a PCV system air-to-fuel ratio. AFR sensor 31 may be an oxygen sensor, for example. In some examples, AFR sensor 31 may be located in crankcase ventilation tube 74 and/or conduit 76.

During non-boosted conditions, the PCV system 116 vents air out of the crankcase and into intake manifold 42 via conduit 76 which, in some examples, may include a one-way PCV valve 78 to provide continual evacuation of gases from inside the crankcase 28 before connecting to the intake manifold 42. In one example, the PCV valve 78 may vary its flow restriction in response to the pressure drop across it (or flow rate through it). However, in other examples conduit 76 may not include a one-way PCV valve. In still other examples, the PCV valve may be an electronically controlled valve that is controlled by controller 48. It will be appreciated that, as used herein, PCV flow refers to the flow of gases through conduit 76 from the crankcase to the intake manifold 42. As an example, the PCV flow may be determined from the fuel (e.g., gaseous fuel) injection rate, the air/fuel ratio in the engine intake, and the exhaust oxygen content via exhaust gas sensor 64, using known methods.

PCV backflow may occur when intake manifold pressure is higher than crankcase pressure (e.g., during boosted engine operation). PCV backflow refers to the flow of gases through conduit 76 from the intake manifold 42 to the crankcase 28. In some examples, PCV system 116 may be equipped with a check valve for preventing PCV backflow. It will be appreciated that while the depicted example shows PCV valve 78 as a passive valve, this is not meant to be limiting, and in alternate examples, PCV valve 78 may be an electronically controlled valve (e.g., a powertrain control module (PCM) controlled valve) wherein a controller 48 of control system 190 may command a signal to change a position of the valve from an open position (or a position of high flow) to a closed position (or a position of low flow), or vice versa, or any position there-between.

During boosted conditions (when MAP is greater than BP), gases flow from the crankcase, through oil separator 81 and into fresh air intake 12 and eventually into the combustion chamber 34. This may be done in a stale air manner where no intake manifold air is let into the crankcase 28 or in a positive crankcase ventilation manner where some manifold air is metered into the crankcase 28.

While the engine is running under light load and moderate throttle opening, the intake manifold air pressure may be less than crankcase air pressure. The lower pressure of the intake manifold 42 draws fresh air towards it, pulling air from the crankcase ventilation tube 74 through the crankcase (where it dilutes and mixes with combustion gases), out of the crankcase via the PCV conduit 76 through the PCV valve 78, and into the intake manifold 42. However, during other conditions, such as heavy load or under boosted conditions, the intake manifold air pressure may be greater than crankcase air pressure. As such, intake air may travel through the PCV conduit 76 and into the crankcase 28.

The gases in crankcase 28 may include un-combusted fuel, un-combusted air, and fully or partially combusted gases. Further, lubricant mist may also be present. As such, various oil separators may be incorporated in positive PCV system 116 to reduce exiting of the oil mist from the crankcase 28 through the PCV system 116. For example, conduit 76 may include a uni-directional oil separator 80 which filters oil from vapors exiting crankcase 28 before they re-enter the intake manifold 42. Another oil separator 81 may be disposed in crankcase ventilation tube 74 to remove oil from the stream of gases exiting the crankcases during boosted operation. Additionally, in some examples, conduit 76 may also include a vacuum sensor 84 coupled to the PCV system 116.

Controller 48 is shown in FIG. 1 as a microcomputer, including microprocessor unit 108, input/output device 111, an electronic storage medium for executable programs and calibration values shown as read only memory chip 113 in this particular example, random access memory 115, keep alive memory 117, and a data bus. Controller 48 may receive various signals from various sensors 119 coupled to engine 110, engine coolant temperature (ECT) from temperature sensor 46; a measurement of intake manifold pressure (MAP) from pressure sensor 86; a measurement of crankcase pressure from pressure sensor 87, a measurement of barometric pressure from BP sensor 51; exhaust gas air/fuel ratio from exhaust gas sensor 64, PCV air-to-fuel ratio sensor 31; and other PCV diagnostic sensors described below. Storage medium read-only memory 113 can be programmed with computer readable data representing instructions executable by processor 108 for performing the methods described below, as well as other variants that are anticipated but not specifically listed.

Under certain conditions, the PCV system 116 may be monitored by a variety of sensors in the PCV system 116. In some examples, a plurality of absolute sensors, e.g., a barometric pressure sensor (BP) 51, a compressor inlet pressure sensor (CIP) 58, and/or a pressure sensor 61 in the crankcase ventilation tube 74, may be used in combination to monitor PCV system pressure. For example, in some approaches, a barometric pressure sensor 51, a compressor inlet sensor 58, and a pressure sensor 61 in the PCV breather tube 74 may all be used in to monitor PCV system pressure.

In an alternate example, MAP and compressor inlet pressure (CIP) and/or MAP and crankcase pressure may be used instead of MAP and BP to determine when the engine is boosted or not boosted. For example, when MAP is less than CIP, the engine may not be boosted. In another example, when MAP is greater than CIP or crankcase pressure, the engine may be boosted.

Fuel injector 96 is shown coupled directly to combustion chamber 34 for injecting fuel directly therein in proportion to the pulse width of signal FPW received from controller 48 via electronic driver (not shown). In this manner, fuel injector 96 provides what is known as direct injection of fuel into combustion chamber 34. The fuel injector may be mounted in the side of the combustion chamber or in the top of the combustion chamber, for example. Fuel may be delivered to fuel injector 66 by a fuel system (not shown in FIG. 2) including a fuel tank, a fuel pump, and a fuel rail. In some examples, combustion chamber 34 may alternatively or additionally include a fuel injector arranged in the intake in a configuration that provides what is known as port injection of fuel into the intake port upstream of combustion chamber 34.

During engine operation, each cylinder within engine 110 typically undergoes a four stroke cycle: the cycle includes the intake stroke, compression stroke, expansion stroke, and exhaust stroke. During the intake stroke, generally, the exhaust valve 92 closes and intake valve 94 opens. Air is introduced into combustion chamber 34 via intake manifold 42, and piston 38 moves to the bottom of the cylinder so as to increase the volume within combustion chamber 34. The position at which piston 38 is near the bottom of the cylinder and at the end of its stroke (e.g. when combustion chamber 34 is at its largest volume) is typically referred to by those of skill in the art as bottom dead center (BDC). During the compression stroke, intake valve 94 and exhaust valve 92 are closed. Piston 38 moves toward the cylinder head so as to compress the air within combustion chamber 34. The point at which piston 38 is at the end of its stroke and closest to the cylinder head (e.g. when combustion chamber 34 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 38 back to BDC. Crankshaft 30 converts piston movement into a rotational torque of the rotary shaft. Finally, during the exhaust stroke, the exhaust valve 92 opens to release the combusted air-fuel mixture to exhaust manifold 60 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

In one example, fuel injection may be adjusted based on an estimated oil dilution amount. Adjusting fuel injection may include advancing a timing of initiation of fuel injection during a cylinder cycle based on the oil dilution amount. Details of estimating the oil dilution amount and adjusting fuel injection based on the oil dilution amount will be further elaborated at FIGS. 3-5. The oil dilution amount may be estimated based on an ambient temperature, an engine block temperature, an engine coolant temperature, an engine speed, an engine load, a fuel injection pressure, a fuel injection timing, an engine operation time, a commanded air-to-fuel ratio, and an engine air-to-fuel ratio. During cold start conditions, when the oil dilution amount is greater than a threshold amount, a timing of initiation of fuel injection may be advanced (in other words, initiation of fuel injection may occur earlier) in a cylinder cycle, with respect to a base timing of initiation of fuel injection that may be utilized when the oil dilution amount is less than the threshold amount. The terms "early", "earlier", and "advanced" when used with respect to fuel injection timing or initiation of fuel injection timing, may be used interchangeably throughout the specification. Likewise, the terms "late", "later", and "retarded" when used with respect to fuel injection timing or initiation of fuel injection timing, may be used interchangeably throughout the specification.

In one example, when fuel injection is advanced, initiation of injection may occur between 340 degrees and 280 degrees before top dead center (BTDC) for the cylinder receiving the injected fuel. In another example, multiple fuel injections may be performed with initiation of a first fuel injection between 340 degrees and 280 degrees BTDC for the cylinder receiving the injected fuel.

In this way, fuel injection may be advanced when an oil dilution amount is greater than threshold. Advancing fuel injection may increase atomization and vaporization of fuel for improved mixing of fuel with cylinder air charge. As a result, combustion efficiency may be improved, and more fuel may be combusted. Consequently, amount of fuel droplets coating the cylinder walls and escaping through piston rings into the crankcase during a combustion cycle may be reduced. As a result, dilution of oil with fuel may be reduced. Further, exhaust gas emissions may be reduced. In some examples, a valve opening timing and/or fuel injection timing may be adjusted to improve vaporization and atomization of fuel in the cylinder, and consequently, reduce oil dilution.

Base fuel injection timing (e.g., fuel injection during warm engine conditions when the oil dilution amount is less than the threshold), wherein initiation of injection may occur between 350 degrees and 300 degrees BTDC for the cylinder receiving the fuel, may be employed to reduce particulate matter and particle number emissions. As such, fuel injection timing during cold conditions may be retarded from fuel injection timing utilized when engine operating temperatures are greater than a threshold temperature. During cold conditions, fuel may pass by the piston rings and increase dilution of engine oil in the crankcase. Further, production of particulate matter in engine exhaust may increase. Therefore, fuel injection timing may be retarded from base timing during cold conditions, but if dilution is present, fuel injection timing may be advanced from cold engine fuel injection timing when dilution is not present. In this way, by adjusting fuel injection based on oil dilution amount, excess oil dilution may be reduced and exhaust emissions may be improved.

FIG. 2 is a simplified schematic showing the flow of oil in a vehicle's lubrication system. Oil is pumped from the oil sump (1002) by an oil pump (1004) to lubricate many of the moving parts of the engine assembly (1006) such as the crankshaft 240 and its connecting rods, and bearings in the connecting rods and pins of the pistons 236. Oil is also used for lubrication between the rings of the engine piston 236 and the engine cylinders 200, forming a sliding oil film seal, and preventing leakage of the fuel/air mixture and exhaust from the combustion chamber into the oil sump during compression and combustion. The thickness and effectiveness of this oil film seal is dependent on the oil temperature and properties such as oil viscosity. After reaching the moving parts of the engine, the oil drains back to the sump.

As discussed herein, oil may be diluted with fuel during engine operation. For example, oil dilution with fuel may increase when late fuel injections are performed. As such, late fuel injections may be utilized to reduce particulate matter and particle number emissions. However, during late fuel injections, fuel may seep through the piston rings due to high cylinder pressures and contaminate the oil in the crankcase. Consequently, start of injection timing may be adjusted to trade particulate emissions for oil dilution or vise-versa. Oil dilution may be monitored based on based on an ambient temperature, an engine block temperature, an engine coolant temperature, an engine speed, an engine load, a fuel injection pressure, a fuel injection timing, an engine operation time, a commanded air-to-fuel ratio, and an engine air-to-fuel ratio as described with respect to FIG. 3, and based on the oil dilution amount, engine operating parameters such as fuel injection timing may be adjusted to reduce oil dilution. Adjustment of fuel injection timing based on oil dilution will be further elaborated with respect to FIGS. 3-5.

Figure 3:
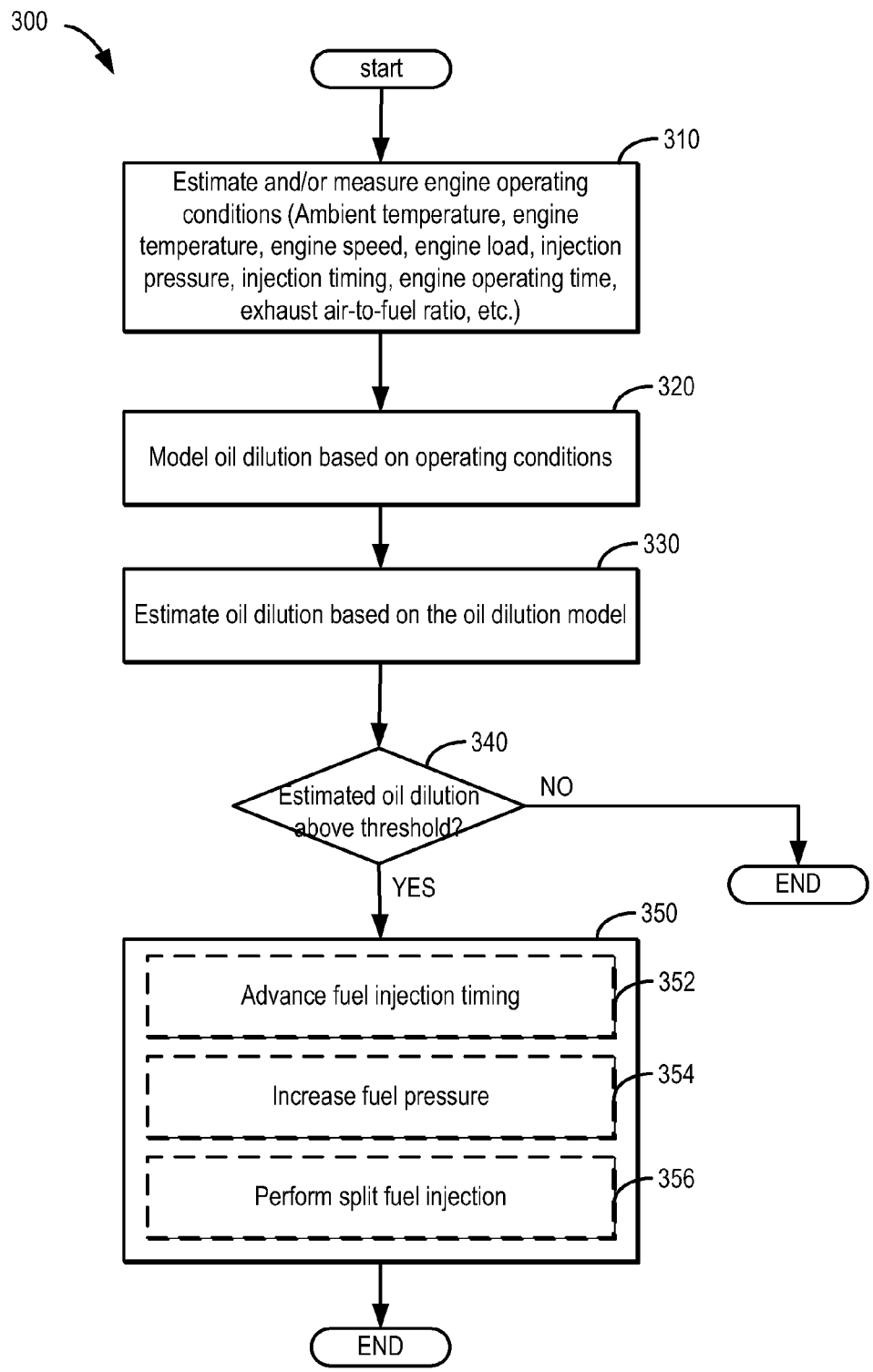
FIG. 3 illustrates an example operating method for adjusting engine operation including fuel injection timing based on an oil dilution amount.

Turning now to FIG. 3, it shows an example routine 300 which illustrates a method for adjusting engine operating conditions including a fuel injection timing based on an oil dilution amount. For example, in response to the oil dilution amount greater than a threshold amount, fuel injection timing may be adjusted such that a start of fuel injection may be timed to occur earlier before top dead center of a cylinder during a combustion cycle of the cylinder receiving the fuel in order to reduce dilution of oil. In response to the oil dilution amount less than the threshold amount, fuel injection timing may be adjusted to occur later before top dead center of the cylinder receiving the fuel to take advantage of reduced particle number emissions during late fuel injection.

At 310, routine 300 may include estimating and/or measuring one or more engine operating conditions. Engine operating conditions may include an ambient temperature, an engine temperature, an engine speed, an engine load, an injection pressure, an injection timing, a duration of engine operation, an engine air-to-fuel ratio, etc. Upon determining the engine operating conditions, the routine may proceed to 320.

At 320, the routine may include determining an oil dilution model based on the engine operating conditions. In one example, the oil dilution model may be based on a difference between a commanded air-to-fuel ratio and an engine air-to-fuel ratio as determined from an exhaust sensor. The commanded air-to-fuel ratio may be determined based on an amount of fuel injection determined by the engine controller to maintain the exhaust gas products at stoichiometric conditions. The engine air-to-fuel ratio may be determined based on a reading from the exhaust UEGO sensor (e.g., sensor 64 at FIG. 1).

For example, during cold start conditions, when it is determined that the controller is commanding more fuel to maintain the engine air-to-fuel ratio at stoichiometry, it may be inferred that the fuel is lost to the oil pan by passing the piston rings. Accordingly, when the commanded air-to-fuel ratio is richer than stoichiometry and the exhaust sensor based engine air-to-fuel ratio is at stoichiometry, an oil dilution amount may be increased. The amount of increase may be based on the integrated difference between the commanded air-to-fuel ratio and the engine air-to-fuel ratio as determined via the exhaust oxygen sensor. Likewise, when the controller is commanding less fuel to maintain the engine air-to-fuel ratio at stoichiometry, it may be inferred that excess fuel (to maintain stoichiometric engine air-to-fuel ratio) may come from the PCV system. Accordingly, the oil dilution amount may be decreased. The amount of decrease may be based on the integrated difference between the commanded air-to-fuel ratio and the engine air-to-fuel ratio.

In another example, the oil dilution model may be based on a duration of engine operation and a fuel injection timing. For example, during engine operation in a warm state (e.g. engine temperature may be at or greater than a threshold temperature, catalyst may be at or greater than a catalyst light-off temperature, etc.), the controller may determine if late fuel injection was carried out at one or more cylinders since engine start. As such, late fuel injections may be performed during a cold start condition to improve particulate emissions. In other words, the start of fuel injection timing during cold start operations may be retarded from start of fuel injection timings when engine is not operating in cold start conditions. However, late fuel injection may increase dilution of oil in the crankcase. Therefore, if late fuel injection was performed since engine start, the controller may determine if a duration of engine operation in the warm state is greater than a threshold duration. The threshold duration may be based on an amount of fuel that was injected late since engine stop. For example, it may take a duration of time with engine operating in warm conditions after cold-start to combust the excess fuel in the PCV system (excess fuel in the PCV system may be due to late fuel injection timings utilized during the cold start to reduce particulate matter and particle number emissions). Therefore, if the duration of engine operation in the warm state is greater than the threshold duration, excess fuel in the PCV system may be combusted. Consequently, the oil dilution amount may be reduced. However, if it is determined that the duration of engine operation is not greater than the threshold duration, excess fuel in the PCV system may not be combusted. As a result, oil dilution amount may not be decreased.

As such, an amount by which the oil dilution amount may be increased or decreased when engine is not operating in cold start conditions may be based on a duration of engine operation in the warm state, and an amount of fuel injected with late fuel injection. For example, the amount of increase of oil dilution amount may increase as the duration of engine operation in the warm state decreases. Further, the amount of increase of oil dilution amount may increase with an increase in the amount of fuel injected late. Similarly, the amount of decrease of oil dilution amount may increase as the duration of engine operation in the warm state increases, and as the amount of fuel injected late decreases.

Next, at 330, an oil dilution amount may be estimated based on the oil dilution model. For example, the oil dilution model may be applied to an oil quality monitor to obtain an estimated oil dilution amount.

In one example, when it is determined that the controller is commanding more fuel to obtain a stoichiometric engine air-to-fuel ratio, the oil quality monitor maintaining a current oil dilution amount may be adjusted by incrementing the oil dilution amount. The amount of increase may be based on the difference between the commanded air-to-fuel ratio and the engine air-to-fuel ratio. As the difference between the commanded air-to-fuel ratio and the engine air-to-fuel ratio increases, the amount of increase of oil dilution amount may increase.

In another example, when it is determined that the controller is commanding less fuel to maintain the engine air-to-fuel ratio at stoichiometry, the oil quality monitor maintaining a current oil dilution amount may be adjusted by decreasing the oil dilution amount.

In still another example, when the commanded air-to-fuel ratio and the engine air-to-fuel ratio are at stoichiometry, it may be inferred that there is no fuel in the oil. That is, oil dilution may be zero.

In yet another example, during a vehicle cold start, a cold start oil dilution quality score may be generated based on the modeled oil dilution. Subsequently, a rolling average of a cold start oil dilution quality score may be determined, and an estimated oil dilution amount may be obtained based on the rolling average.

Upon estimating the oil dilution amount, the routine may proceed to 340. At 340, routine 300 may include determining if the estimated oil dilution amount is greater than a threshold. In one example, the threshold may be based on a number of cold start operations without warm-up, the estimated dilution, and an estimated hot cycle dilution at shutdown. If the estimated oil dilution is greater than the threshold, the routine may proceed to 350.

At 350, the controller may adjust one or more engine operating conditions to reduce oil dilution. The one or more engine operating parameters may include advancing a fuel injection timing (at 352), increasing a fuel pressure (at 354), and performing a split fuel injection (at 356).

For example, when the estimated oil dilution amount is greater than the threshold, the fuel injection timing may be advanced with respect to fuel injection timing when the estimated oil dilution amount is less than the threshold. In other words, a start of fuel injection may be adjusted to occur earlier in a cylinder cycle. As such, during cold start conditions when oil dilution is less than the threshold, the fuel injection timing may be retarded with respect to fuel injection timing when the engine is operating in a warm state (e.g. when engine temperature is above a threshold temperature) in order to reduce particulate matter emissions. However, when it is determined that the oil dilution is greater than the threshold, the controller may adjust fuel injection timing earlier (that is, advance fuel injection timing) to prevent further dilution and/or reduce current dilution amount. As such, fuel may be delivered to each cylinder via its own fuel injector. In one example, fuel injector may be a direct fuel injector (e.g. fuel injector 96 at FIG. 1) configured for injecting fuel directly into a cylinder. In another example, fuel injector may be a port fuel injector configured for injecting fuel upstream of an intake valve. In some examples, fuel may be delivered by both injectors to the cylinder during a single cycle of the cylinder. In one example, fuel injection timing may be adjusted such that fuel is injected earlier during intake (e.g. 340 degrees-280 degrees BTDC).

By adjusting fuel injection to occur early, vaporization and atomization of fuel may be increased. Consequently, mixing of fuel with cylinder air charge may be increased and therefore, combustion efficiency may be increase. As combustion efficiency increases, more fuel may be combusted and lesser fuel may enter the PCV system. As a result, dilution of oil with fuel may decrease when fuel injection is adjusted to occur early.

In another example, fuel pressure may be increased to reduce oil dilution when the oil dilution amount increases above the threshold dilution. As such, the fuel pressure may be based on an engine coolant temperature and an amount of fuel in the sump.

In some examples, a valve opening timing and/or initiation of the fuel injection may be adjusted to improve vaporization and atomization of fuel in the cylinder, and consequently, oil dilution may be reduced.

In further examples, split fuel injections including multiple fuel injections may be performed to improve vaporization and atomization of fuel with a pilot start of injection timing between 340 degrees and 280 degrees BTDC. In this way, engine operating parameters may be adjusted based on the oil dilution amount to reduce oil dilution and improve emissions.

In one example, a method for a vehicle engine may comprise adjusting a fuel injection timing earlier to reduce oil dilution in response to an oil dilution amount is greater than a threshold dilution amount. Further, the oil dilution amount may be determined based on an integrated difference between a first air-to-fuel ratio and a second air-to-fuel ratio; wherein the first air-to-fuel ratio comprises a commanded air-to-fuel ratio, and wherein the second air-to-fuel ratio comprises an engine air-to-fuel ratio. The commanded air-to-fuel ratio may be based on a fuel injection amount commanded by an engine controller to maintain the engine air-to-fuel ratio at stoichiometry. Further, the oil dilution amount may be increased when the commanded air-to-fuel ratio is less than the engine air-to-fuel ratio, and the oil dilution amount may be decreased when the commanded air-to-fuel ratio is greater than the engine air-to-fuel ratio. Still further, the oil dilution amount may be further determined based on a duration when an engine temperature is less than a threshold engine temperature. Additionally, the fuel injection timing may be adjusted to occur later in response to the oil dilution amount being less than the threshold level. Further, the fuel injection timing may be adjusted to occur later in response to an oil change being performed.

Figure 4A:
FIG. 4A shows example tables for hot and cold start of injection timings.
Figure 4A:
Figure 5:
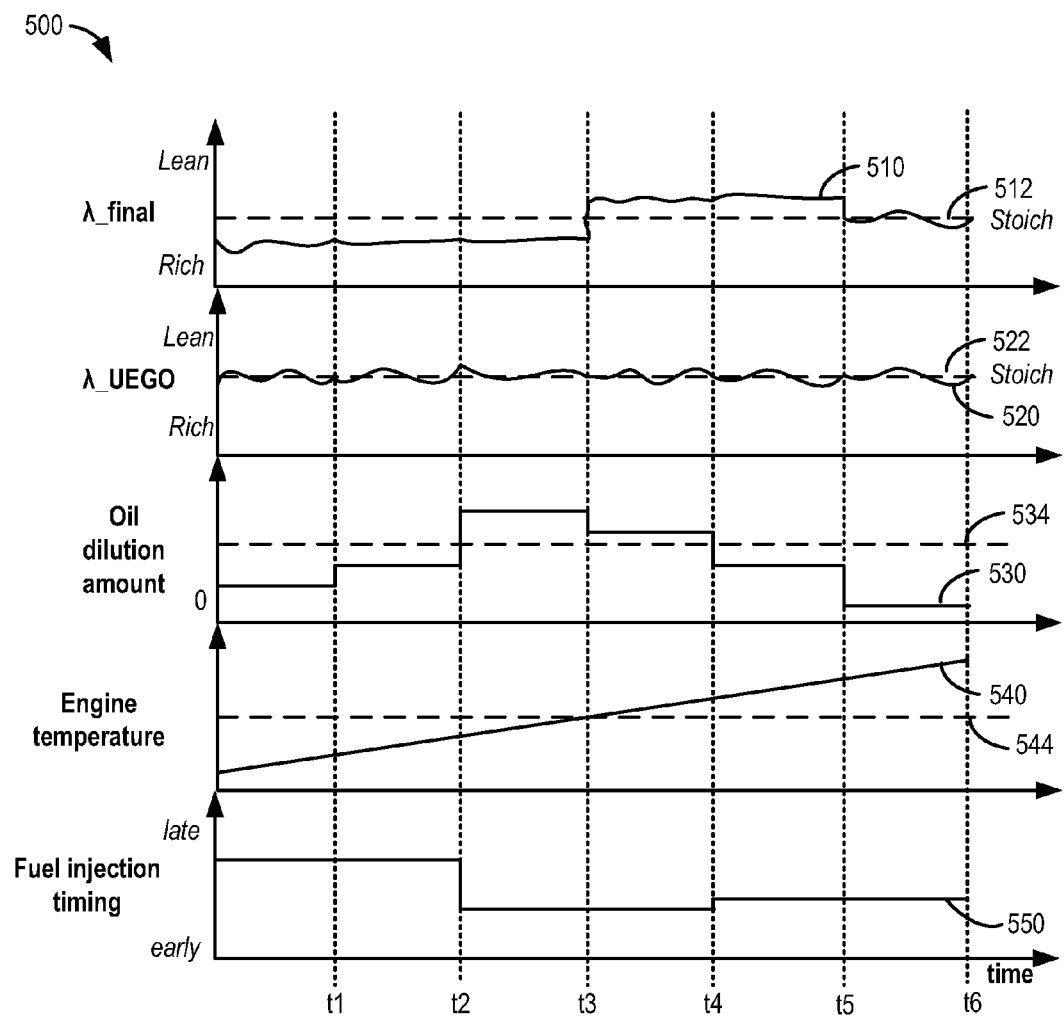
FIG. 5 shows an example determination of oil dilution amount based on an integrated difference between a commanded air-to-fuel ratio and an engine air-to-fuel ratio, and adjustment of fuel injection timing based on the oil dilution amount.

Turning next to FIG. 4A, an example table for start of injection (SOI) timings during cold engine operations (herein referred to as "cold SOI timings") and an example table for start of injection timings during hot engine operations (herein referred to as "hot SOI timings") at different engine speed and engine load conditions are shown at table 402 and at table 404 respectively. The SOI timings are indicated in degrees before top dead center (BTDC). Engine load is indicated as normalized load, with full load indicated as 1. As such, load may be calculated based on an air mass flow into the engine. Engine speed is indicated in revolutions per minute (rpm). Cold engine operations may include engine operations at an engine temperature below a threshold temperature. In one example, cold engine operations may include engine operations when an exhaust catalyst temperature is below a threshold activation temperature. In another example, cold engine operations may additionally include operations when an ambient temperature is below a threshold ambient temperature. Hot engine operation may include engine operations during one or more of the engine temperature above the threshold temperature, the exhaust catalyst temperature above the threshold activation temperature, and the ambient temperature above the threshold ambient temperature.

The cold SOI timings (table 402) may be retarded from hot SOI timings (table 404) in order to reduce particulate matter emissions during cold start conditions. In other words, hot SOI timings may be advanced from cold SOI timings. In one example, hot SOI timings may be +30 degrees advanced from cold SOI timings.

During cold start conditions, the cold SOI timings that are normally retarded from hot SOI timings may be advanced when an oil dilution amount is greater than a threshold dilution. The threshold dilution may be based on a number of cold start engine operations without warm up, an estimated dilution amount, and an estimated hot cycle dilution at shutdown. For example, during cold start conditions, when the oil dilution amount is less than the threshold dilution, SOI timings may be between 300 degrees and 250 degrees BTDC. As such, during cold start conditions when the oil dilution amount is less than the threshold, SOI timings may be retarded (table 402) to reduce particulate matter emissions. By retarding SOI, impingement of liquid fuel on the piston bowl may be reduced. As a result, fuel vaporization and mixing of intake air with fuel may be improved and consequently, particulate matter emissions may be reduced.

When the oil dilution amount is greater than the threshold dilution, engine operation may be adjusted to reduce oil dilution. Therefore, when the oil dilution amount is greater than the threshold dilution, the cold SOI timings (normally retarded from hot SOI timings) may be advanced. By advancing SOI timings, the oil dilution amount may be decreased.

In this way, by advancing start of fuel injection upon determining that oil dilution is greater than threshold, excess fuel dilution may be reduced, and by retarding start of fuel injection upon determining that oil dilution is less than threshold, particulate matter and particle number emissions may be improved. In this way, the SOI timings may be adjusted during cold start conditions based on oil dilution amount to reduce oil dilution or to reduce particulate matter emissions.

Figure 4B:
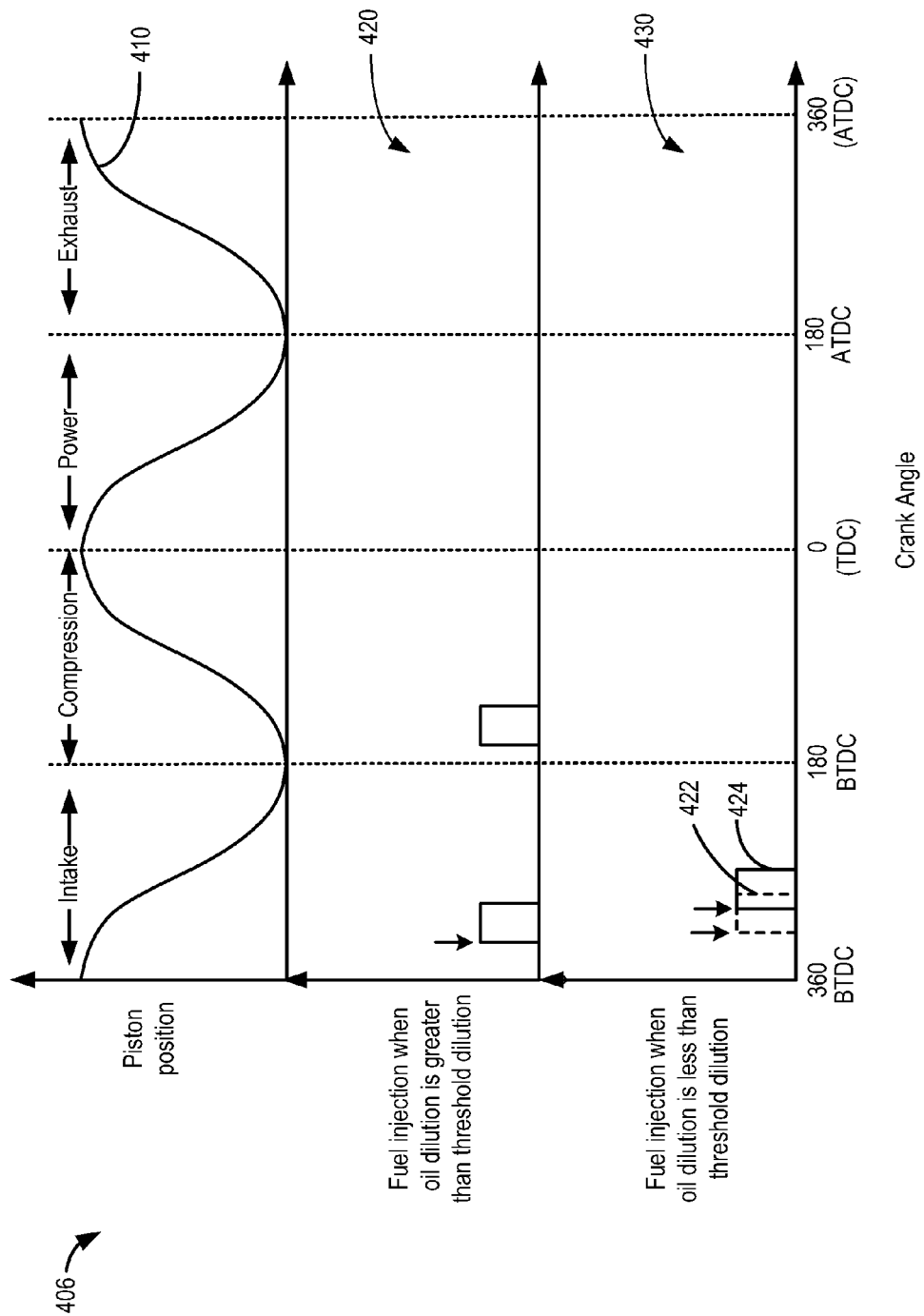
FIG. 4B shows an example fuel injection profile according to the present disclosure.

Turning to FIG. 4B, map 400 illustrates an engine position along the x-axis in crank angle degrees (CAD). Curve 410 depicts piston positions (along the y-axis), with reference to their location before top dead center (BTDC) and/or after top dead center (ATDC), and further with reference to their location within the four strokes (intake, compression, power and exhaust) of an engine cycle. As indicated by sinusoidal curve 410, a piston gradually moves downward from TDC, bottoming out at BDC by the end of the intake stroke. The piston then returns to the top, at TDC, by the end of the compression stroke. The piston then again moves back down, towards BDC, during the power stroke, returning to its original top position at TDC by the end of the exhaust stroke.

The second plot (from the top) of map 400 depicts an example fuel injection profile that may be used when oil dilution amount is greater than threshold, such as during a cold start condition of the engine, to reduce further dilution of oil in a crankcase.

The third plot (from the top) of map 400 depicts example fuel injection profiles 422 and 424 that may be used when the oil dilution amount is less than threshold. Specifically, fuel injection profile 422 depicts fuel injection timing during hot engine operating conditions, such as after the engine has warmed up to a temperature above a threshold temperature. Fuel injection profile 424 depicts fuel injection timing during cold start conditions. The oil dilution amount may be determined based on engine operating conditions including an engine temperature, an ambient temperature, an engine speed, an engine load, a fuel injection pressure, a fuel injection timing, a duration of engine operation, a commanded air-to-fuel ratio, and an engine air-to-fuel ratio as discussed at FIG. 3. Arrows in the second plot and the third plot indicate start of fuel injection timing for the pilot (first) fuel injection.

As discussed above with respect to FIG. 4A, the start of injection timings during cold start conditions may be retarded from the start of injection timings when engine is not operating in cold start conditions (e.g., when an engine temperature is greater than a threshold temperature). As such, cold SOI timings may be retarded in order to reduce particulate matter emissions. However, when the oil dilution amount is greater than the threshold dilution during cold start conditions, the retarded cold SOI timings may be advanced to mitigate excess oil dilution. The threshold dilution may be based on a number of cold starts without warm-up, an estimated oil dilution, and an estimated hot cycle oil dilution at engine shutdown. Further, the SOI timings may be based on engine speed and engine load. For example, as the engine load increases, a degree of retard of the SOI timing may increase, and as the engine speed increases, the degree of retard may decrease.

As an example, during cold start conditions, when the oil dilution amount is greater than threshold, the controller may advance fuel injection timings such that the start of injection may occur between 340 degrees and 280 degrees BTDC (plot 420). That is, fuel injection timing may be adjusted such that start of injection may occur at an earlier time during the intake stroke.

In some examples (as depicted at plot 420), multiple fuel injections may be performed, wherein a portion of fuel may be injected during intake stroke and a remaining portion of fuel may be injected (in one or more injections) at a later time during intake stroke and/or during compression stroke.

In some other examples, a single fuel injection may be performed at intake stroke with start of injection between 340 degrees and 280 degrees BTDC.

By adjusting fuel injection timing early and/or performing multiple fuel injections, vaporization and atomization of fuel may improve. Consequently, combustion efficiency may improve. With improved combustion efficiency, more fuel may be combusted reducing the likelihood of fuel seeping through the piston rings and diluting the oil.

When the oil dilution amount is less than threshold, the controller may adjust fuel injection timing for late fuel injection (plot 430). That is, start of injection timing may be retarded. For example, fuel injection timing may be adjusted such that start of injection may occur between 300 degrees and 250 degrees BTDC. While single fuel injection is shown, it will be appreciated that multiple fuel injections may be performed. In some examples, when multiple fuel injections are performed per combustion cycle, timing of at least one injection may be adjusted to occur later in the cycle. By performing late fuel injections particulate matter and particle emissions may be reduced.

In this way, fuel injection timing may be adjusted in response to oil dilution. By adjusting fuel injection timing to occur early when the oil dilution is greater than a threshold, excess dilution of oil with fuel may be reduced. By adjusting fuel injection timing to occur late when the oil dilution is less than threshold, particulate matter and particle number emissions may be reduced.

In one example, a method for an engine may comprise: adjusting a fuel injection timing of multiple injections per combustion cycle earlier before top dead center in response to an oil dilution level being greater than a threshold level; and adjusting fuel injection timing for at least one injection per combustion cycle later before top dead center in response to the oil dilution level being less than the threshold level. Further, calculating the oil dilution level may be based on an integrated difference between a commanded air-to-fuel ratio and an engine air-to-fuel ratio when an engine temperature is less than a threshold temperature, wherein the oil dilution level is incremented when the commanded air-to-fuel ratio is richer than the engine air-to-fuel ratio, and the oil dilution level is decremented when the commanded air-to-fuel ratio is leaner than the engine air-to-fuel ratio. Further, adjusting the fuel injection timing comprises adjusting a start of injection timing. In some examples, the oil dilution level may comprise a time-averaged oil dilution level.

Turning to FIG. 5, it shows operating sequence 500 depicting an example determination of an oil dilution amount based on an engine air-to-fuel ratio and a commanded air-to-fuel ratio, and adjustment of fuel injection timing based on the oil dilution amount. The sequence of FIG. 5 may be provided by executing instructions in the system of FIGS. 1-2 according to the method of FIG. 3. Vertical markers at times t0-t6 represent times of interest during the sequence.

The first plot from the top of FIG. 5 represents commanded air-to-fuel ratio (λ_final) versus time. The Y axis represents commanded air-to-fuel ratio and a leanness of the commanded air-to-fuel ratio increases in the direction of Y axis arrow. The X axis represents time and time increases from the left side of the plot to the right side of the plot. Horizontal line 512 represents a stoichiometric air-to-fuel ratio.

The second plot from the top of FIG. 5 represents engine air-to-fuel ratio (λ_UEGO) versus time. The Y axis represents engine air-to-fuel ratio and a leanness of the engine air-to-fuel ratio increases in the direction of Y axis arrow. The X axis represents time and time increases from the left side of the plot to the right side of the plot. Horizontal line 522 represents a stoichiometric air-to-fuel ratio.

The third plot from the top of FIG. 5 represents oil dilution amount versus time. The Y axis represents oil dilution amount and the oil dilution amount increases in the direction of the Y axis arrow. The X axis represents time and time increases from the left side of the plot to the right side of the plot. Horizontal line 534 represents a threshold oil dilution amount.

The fourth plot from the top of FIG. 5 represents engine temperature versus time. The Y axis represents engine temperature and the engine temperature increases in the direction of the Y axis arrow. Horizontal line 544 represents a threshold engine temperature at 544, and The fifth plot from the top of FIG. 5 represents fuel injection timing versus time. The Y axis represents fuel injection timing and the fuel injection timing retards in the direction of the Y axis arrow. The early and late fuel injection timing denotes start of fuel injection occurring early and late in a combustion cycle. It must be noted that the term "early fuel injection timing" may be used to denote advanced fuel injection timing and the term "late fuel injection timing" may be used to denote retarded fuel injection timing. As indicated herein, the terms "early" and "advanced" when used with respect to injection timing may be used interchangeably throughout the specification. Likewise, the terms "late" and "retarded" when used with respect to fuel injection timing may be used interchangeably.

As such, the commanded air-to-fuel ratio may be determined based on engine speed, load and temperature conditions, the engine air-to-fuel ratio may be determined based on an exhaust oxygen sensor (e.g. universal exhaust gas oxygen sensor (UEGO)) reading, the oil dilution amount may be determined based on the commanded air-to-fuel ratio and the engine air-to-fuel ratio, and the engine temperature may be determined based on one or more of an engine coolant temperature and an engine block temperature.

At time prior to t1, the engine may be operated in cold start conditions. For example, cold start conditions may include one or more of an engine temperature may be below a threshold temperature (540), and an exhaust catalyst temperature below an activation temperature. In one example, engine cold-start conditions may be confirmed when the engine has been shut-down for more than a threshold shut-down duration. Additional considerations in assessing an engine cold-start condition may include ambient conditions (such as ambient temperature conditions). Further, prior to t1, in order to maintain a stoichiometric engine air-to-fuel ratio (520), the controller may command more fuel. That is, the commanded air-to-fuel ratio (510) may be rich indicating that an amount of fuel may be lost to the crank case through the piston rings. As a result, oil dilution with fuel may increase. In other words, the oil dilution amount may increase. The oil dilution amount may be based on the integrated difference between the engine air-to-fuel ratio and the commanded air-to-fuel ratio. However, the oil dilution amount may be below a threshold amount. Therefore, operations to mitigate oil dilution (e.g. advance start of injection (SOI) timing with respect to a base injection timing when oil dilution is less than the threshold) may not be performed, and operations to reduce emissions (e.g., utilize the base fuel injection timing which is retarded with respect to SOI timing when engine is operating at temperatures above a threshold) may be performed. That is, fuel may be injected such that SOI may be timed to occur later in order to reduce particulate matter emissions. For example, start of injection may be adjusted between 300 degrees and 250 degrees BTDC of the cylinder receiving the fuel.

At time t1, and between t1 and t2, the engine temperature may continue to be below the threshold. Further, the controller may continue to command more fuel (510) to maintain the engine air-to-fuel ratio (520) at stoichiometry indicating that fuel is lost to the crankcase. Consequently, the oil dilution amount (530) may increase. However, the increased oil dilution amount (530) may be less than the threshold oil dilution amount (534). Consequently, SOI may be timed to occur later with respect to SOI timing utilized when the engine temperature is above the threshold temperature. For example, when the engine temperature is below the threshold temperature and the oil dilution amount is below the threshold dilution amount, start of fuel injection may be adjusted between 300 degrees and 250 degrees BTDC.

Next, at time t2, and between t2 and t3, engine temperature may increase (540) but may continue to remain below the threshold temperature (544). Due to late fuel injections (prior to t1, and from t1 to t2), oil may be diluted with fuel vapors, and engine may not be operating in the warm state (that is, engine temperature may not be above the threshold (544)) for a sufficient duration of time to combust the fuel. Consequently, the oil dilution amount (plot 530) may be greater than the threshold oil dilution amount (534). Since the oil dilution amount is greater than the threshold dilution amount, engine operations to mitigate oil dilution may be performed. That is, fuel injection timing may be adjusted such that SOI may occur early with respect to SOI utilized when oil dilution is less than the threshold dilution in order to reduce oil dilution. For example, when the engine temperature is below the threshold temperature and the oil dilution amount is above the threshold dilution amount, SOI may be adjusted to occur between 340 degrees and 280 degrees BTDC of the cylinder receiving the fuel.

In one example, split fuel injection may be performed to mitigate excess oil dilution. For example, during split fuel injection, a pilot fuel injection may be performed with SOI between 340 degrees and 280 degrees BTDC of the cylinder receiving the fuel and subsequent fuel injection may be performed later during intake and/or early during compression stroke.

Next, at time t3, and between t3 and t4, the engine temperature (plot 540) may be at or above the threshold temperature (544). The controller may command less fuel than stoichiometry (that is, λ_final may be lean), yet, the engine air-to-fuel ratio may be at stoichiometry due to the engine drawing extra fuel from the PCV system. Consequently, the oil dilution amount may decrease. However, the decreased oil dilution amount may be greater than threshold dilution amount. Therefore, the fuel injection pulse may be adjusted for early SOI to further reduce dilution. As discussed above, start of injection may be timed to occur between 340 degrees and 280 degrees BTDC of the cylinder receiving the fuel. By adjusting start of injection to occur early, oil dilution may be reduced.

Next, at time t4 and between t4 and t5, engine temperature may continue to be above threshold, and the controller may command less fuel (that is, λ_final leaner than stoichiometry) due to more fuel vapors being drawn from PCV and being combusted. Consequently, the oil dilution amount may decrease and the decreased oil dilution amount (plot 530) may be below the oil dilution threshold (534). As such, an amount of decrease may be based on an engine oil temperature and a PCV valve flow rate. For example, as an engine oil temperature increases, the amount of decrease may increase, and as a PCV valve flow rate increases, the amount of decrease may increase.

Further, the engine may not be operating in cold start conditions (engine temperature above threshold temperature (544)). Therefore, fuel injection timing may be adjusted for start of injections to occur early relative to fuel injections during cold start conditions. For example, fuel injections may be adjusted based on engine speed and load as discussed with respect to FIG. 4B. However, it must be noted that some amount of fuel may be present in the oil (that is, oil dilution amount is not zero) due to the controller commanding less fuel than stoichiometry while maintaining engine air-to-fuel ratio at stoichiometry.

Next, at time t5, and between t5 and t6, the engine temperature may continue to remain above the threshold temperature, and the commanded air-to-fuel ratio and the engine air-to-fuel ratio may be at stoichiometry indicating that no extra fuel is coming from the PCV system or going into the PCV system. That is, when λ_final and λ_UEGO are at stoichiometry, it may be inferred that most of the fuel is removed from the oil. In other words, oil dilution amount is nearly zero. Therefore, fuel injection timing may be adjusted for hot engine operations (e.g., when the engine temperature is above the threshold temperature) based on engine speed and load conditions as discussed above and with respect to FIG. 4A.

In one example, when engine is not operating in cold start conditions (e.g. when engine temperature is greater than the threshold temperature), if late fuel injection was performed since an engine start event, the controller may determine is a duration of time when engine was operated in warm conditions since the engine start event is greater than threshold. If the answer is yes, excess fuel in the PCV system may be combusted due to engine operation in the warm state and accordingly, the oil dilution amount may be decreased. However, if the duration of engine operation in warm conditions is not greater than the threshold duration, sufficient duration may not have elapsed for excess fuel that was injected late since engine start to combust. Consequently, oil dilution amount may be increased. Further, based on whether the oil dilution amount is greater or less than threshold, fuel injection timing may be adjusted. For example, fuel may be injected early if oil dilution amount is greater than threshold, and fuel may be injected late if oil dilution amount is less than threshold.

In this way, the engine air-to-fuel ratio and the commanded air-to-fuel ratio may be utilized to determine dilution of oil in the crankcase. Further, fuel injection timing may be adjusted to occur advanced or retarded in response to the determined oil dilution above or below the threshold. By adjusting fuel injection earlier excess oil dilution may be prevented, and by adjusting fuel injection later, particulate matter and particle number emissions may be improved.

In one example, a method for an engine may comprise: during a first condition when an oil dilution amount is greater than a threshold, adjusting a fuel injection timing earlier; and during a second condition when the oil dilution amount is less than the threshold, adjusting a fuel injection timing later than the earlier timing. The first condition may further include a commanded air-to-fuel ratio richer than a threshold air-to-fuel ratio. Further, during the first condition, an engine temperature is less than a threshold engine temperature. Still further, during the first condition, multiple fuel injections may be performed. The second condition may further comprise the commanded air-to-fuel ratio less than the threshold air-to-fuel ratio. Further, during the second condition, engine temperature may be greater than the threshold engine temperature, and still further, during the second condition, the engine temperature may be greater than the threshold engine temperature for longer than a threshold time.

In another example, a commanded air-fuel ratio and an exhaust air-fuel ratio may be measured after engine run-up from a cold start as the engine comes to the idle speed. An integrated difference between the commanded and the exhaust air-fuel ratio can indicate oil dilution and an engine controller may adjust fuel injection timing of a subsequent engine start only if the current engine start does not last long enough to reduce the oil dilution by being operated for a sufficient time above a threshold engine temperature. If so, the subsequent engine start may advance one or more injection timings during the engine start compared with the alternative situation in which the engine was operated for the sufficient time above the threshold engine temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine, comprising:
determining an oil dilution amount based on an integrated difference between a first air-to-fuel ratio and a second air-to-fuel ratio, wherein the first air-to-fuel ratio comprises a commanded air-to-fuel ratio, and wherein the second air-to-fuel ratio comprises an engine air-to-fuel ratio based on an oxygen sensor output;
advancing a fuel injection timing with respect to a base fuel injection timing in a first combustion cycle to reduce oil dilution in response to the oil dilution amount being greater than a threshold dilution amount; and
applying the base fuel injection timing when the oil dilution amount is less than the threshold dilution amount.

2. The method of claim 1, wherein the commanded air-to-fuel ratio is based on a fuel injection amount commanded by an engine controller to maintain the engine air-to-fuel ratio at stoichiometry.

3. The method of claim 2, wherein the oil dilution amount is increased when the commanded air-to-fuel ratio is less than the engine air-to-fuel ratio.

4. The method of claim 2, wherein the oil dilution amount is decreased when the commanded air-to-fuel ratio is greater than the engine air-to-fuel ratio.

5. The method of claim 1, wherein the oil dilution amount is further determined based on a duration when an engine temperature is less than a threshold engine temperature.

6. The method of claim 1, wherein the base fuel injection timing is when an engine temperature is above a threshold temperature.

7. The method of claim 6, further comprising applying the base fuel injection timing in response to an oil change being performed.

8. A method for an engine, comprising:
during a first condition when an oil dilution amount is greater than a threshold, adjusting a fuel injection timing earlier; and
during a second condition when the oil dilution amount is less than the threshold, adjusting a fuel injection timing later than the earlier timing, the oil dilution amount based on an integrated difference between a commanded air-to-fuel ratio and an engine air-to-fuel ratio determined via an oxygen sensor.

9. The method of claim 8, wherein the first condition further comprises when the commanded air-to-fuel ratio is richer than a threshold air-to-fuel ratio.

10. The method of claim 9, wherein the first condition further comprises when an engine temperature is less than a threshold engine temperature.

11. The method of claim 8, wherein the first condition further comprises performing multiple fuel injections.

12. The method of claim 9, wherein the second condition further comprises when the commanded air-to-fuel ratio is less than the threshold air-to-fuel ratio.

13. The method of claim 10, wherein the second condition further comprises when an engine temperature is greater than the threshold engine temperature.

14. The method of claim 13, wherein the second condition further comprises when the engine temperature is greater than the threshold engine temperature for longer than a threshold time.

15. A method for an engine, comprising:
calculating an oil dilution level based on an integrated difference between a commanded air-to-fuel ratio and an engine air-to-fuel ratio when an engine temperature is less than a threshold temperature;
adjusting a fuel injection timing of multiple injections per combustion cycle earlier before top dead center of a cylinder receiving fuel in response to the oil dilution level being greater than a threshold level; and
adjusting fuel injection timing for at least one injection per combustion cycle later before top dead center of the cylinder receiving fuel in response to the oil dilution level being less than the threshold level.

16. The method of claim 15, wherein the oil dilution level is incremented when the commanded air-to-fuel ratio is richer than the engine air-to-fuel ratio and the oil dilution level is decremented when the commanded air-to-fuel ratio is leaner than the engine air-to-fuel ratio.

17. The method of claim 15, wherein the oil dilution level comprises a time-averaged oil dilution level.

18. The method of claim 15, wherein adjusting the fuel injection timing comprises adjusting a start of injection timing.

* * * * *